US012781834B2

(12) United States Patent
Kim

(10) Patent No.: US 12,781,834 B2
(45) Date of Patent: *Nov. 3, 2026

(54) MOTOR DRIVE MECHANISM AND HOLLOW SWIVEL ACTUATOR USING SAME

(71) Applicant: AMOTECH CO., LTD, Incheon (KR)

(72) Inventor: Byung Soo Kim, Incheon (KR)

(73) Assignee: AMOTECH CO., LTD, Incheon (KR)

(*) Notice: Subject to any disclaimer, the term of this patent is extended or adjusted under 35 U.S.C. 154(b) by 0 days.

This patent is subject to a terminal disclaimer.

(21) Appl. No.: 19/144,955

(22) PCT Filed: Jan. 4, 2024

(86) PCT No.: PCT/KR2024/000216
§ 371 (c)(1),
(2) Date: Jun. 30, 2025

(87) PCT Pub. No.: WO2024/151007
PCT Pub. Date: Jul. 18, 2024

(65) Prior Publication Data

US 2026/0243332 A1 Aug. 20, 2026

(30) Foreign Application Priority Data

Jan. 12, 2023 (KR) ........................ 10-2023-0004996

(51) Int. Cl.
*F16H 19/00* (2006.01)
*F16H 19/08* (2006.01)
(Continued)

(52) U.S. Cl.
CPC ............. *F16H 19/08* (2013.01); *H02K 7/083* (2013.01); *H02K 7/1166* (2013.01); *H02K 11/33* (2016.01); *H02K 21/16* (2013.01); *H02K 2211/03* (2013.01)

(58) Field of Classification Search
CPC ............ F16H 1/16; F16H 1/225; F16H 19/08; H02K 7/1166
See application file for complete search history.

(56) References Cited

FOREIGN PATENT DOCUMENTS

| | | | |
|---|---|---|---|
| CN | 112848980 A | | 5/2021 |
| CN | 216618421 U | * | 5/2022 |

(Continued)

OTHER PUBLICATIONS

International Search Report—PCT/KR2024/000216 dated Apr. 8, 2024.

*Primary Examiner* — Gregory Robert Weber
(74) *Attorney, Agent, or Firm* — CANTOR COLBURN LLP

(57) ABSTRACT

Provided is a motor drive mechanism and a hollow swivel actuator using same. The swivel actuator includes: an actuator housing having a hollow cylindrical part, protruding upward, in the center thereof; a motor drive mechanism provided with a worm gear, in the middle portion of a rotary shaft, which produces rotational outputs from first and second drive motors; a sun gear in which a spur gear is arranged on the upper side thereof, and a worm wheel is arranged on the lower side thereof, which engages with the worm gear and carries out a primary reduction; a plurality of pinion gears that engage with the spur gear of the sun gear to rotate; and a rotary table in which the plurality of pinion gears engage with the ring gears to carry out a secondary reduction.

14 Claims, 12 Drawing Sheets

(51) Int. Cl.

| | |
|---|---|
| ***H02K 7/08*** | (2006.01) |
| ***H02K 7/116*** | (2006.01) |
| ***H02K 11/33*** | (2016.01) |
| ***H02K 21/16*** | (2006.01) |

(56) References Cited

FOREIGN PATENT DOCUMENTS

| | | | | | |
|---|---|---|---|---|---|
| JP | 2012047277 | A | | 3/2012 | |
| KR | 100580893 | B1 | | 5/2006 | |
| KR | 20110069456 | A | | 6/2011 | |
| KR | 20160099787 | A | | 8/2016 | |
| KR | 20210083196 | A | * | 7/2021 | ............. H02K 7/116 |
| KR | 20220056821 | A | | 5/2022 | |
| KR | 20220134445 | A | | 10/2022 | |

* cited by examiner

【FIG. 1】
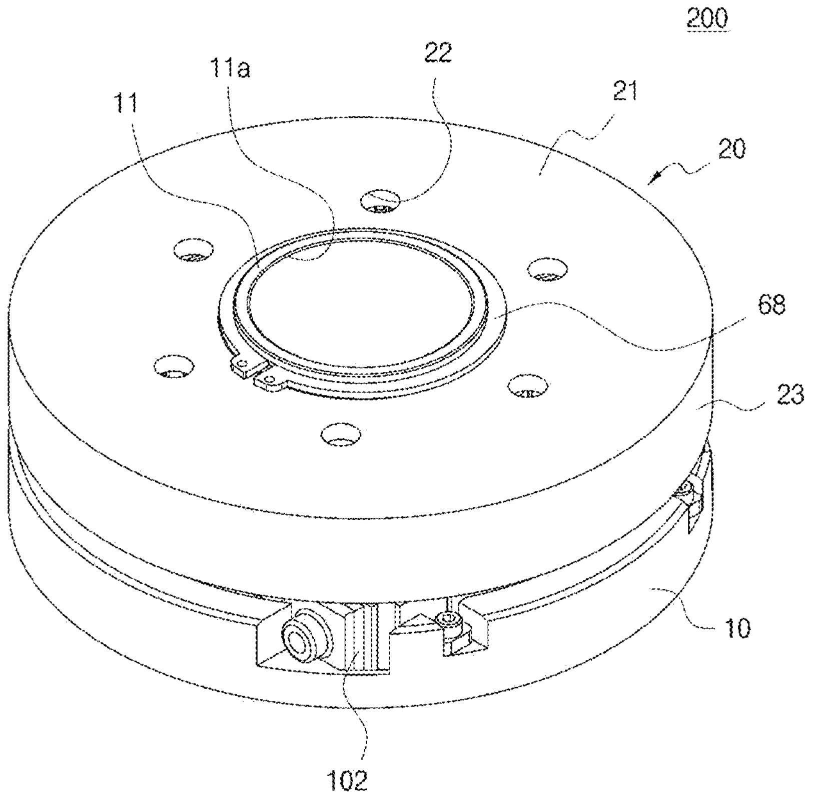

【FIG. 2】
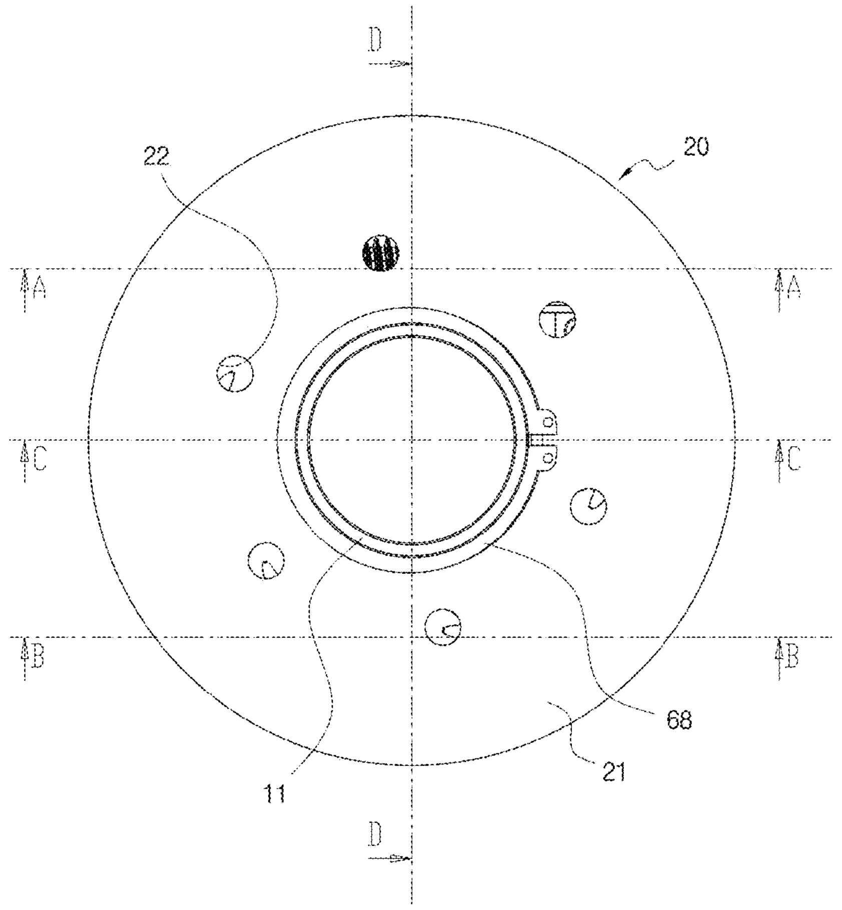

【FIG. 3A】
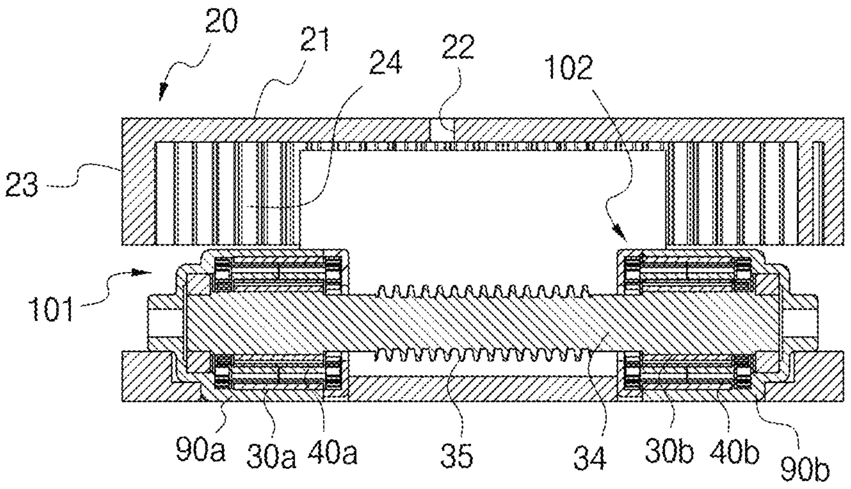
【FIG. 3B】
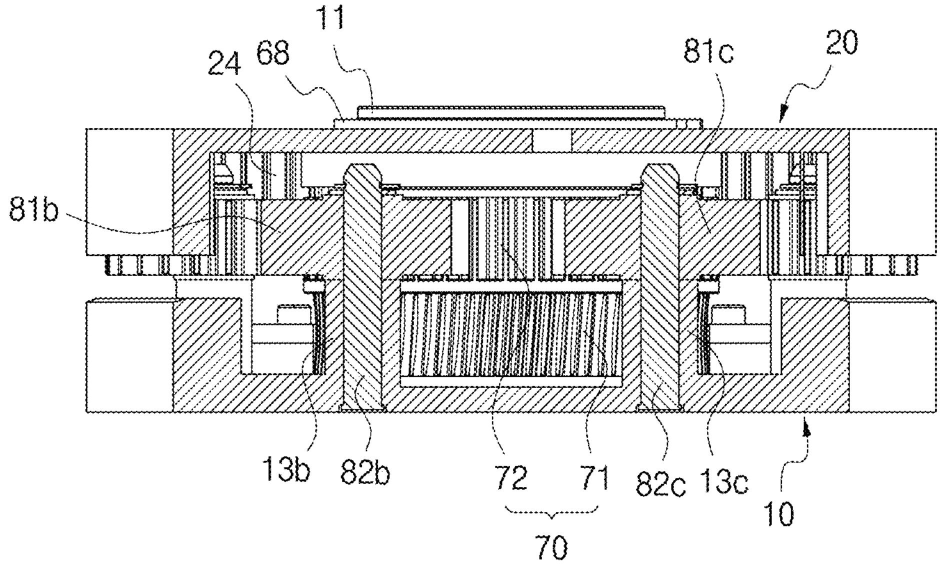

【FIG. 3C】
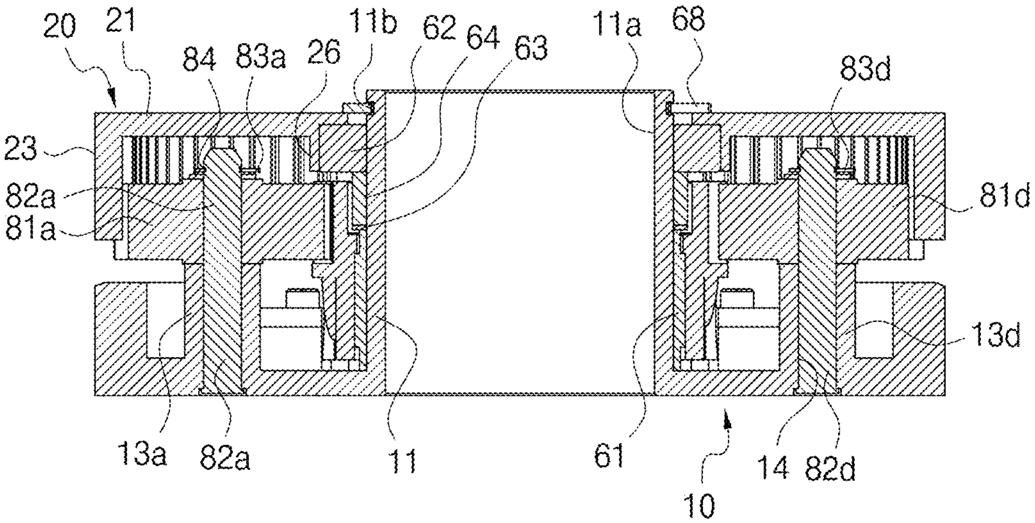
【FIG. 3D】
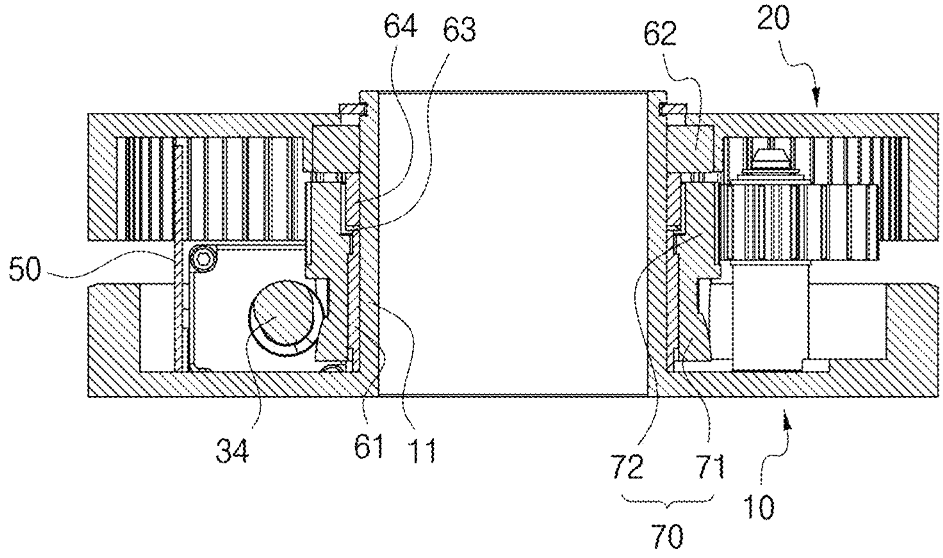

【FIG. 4】
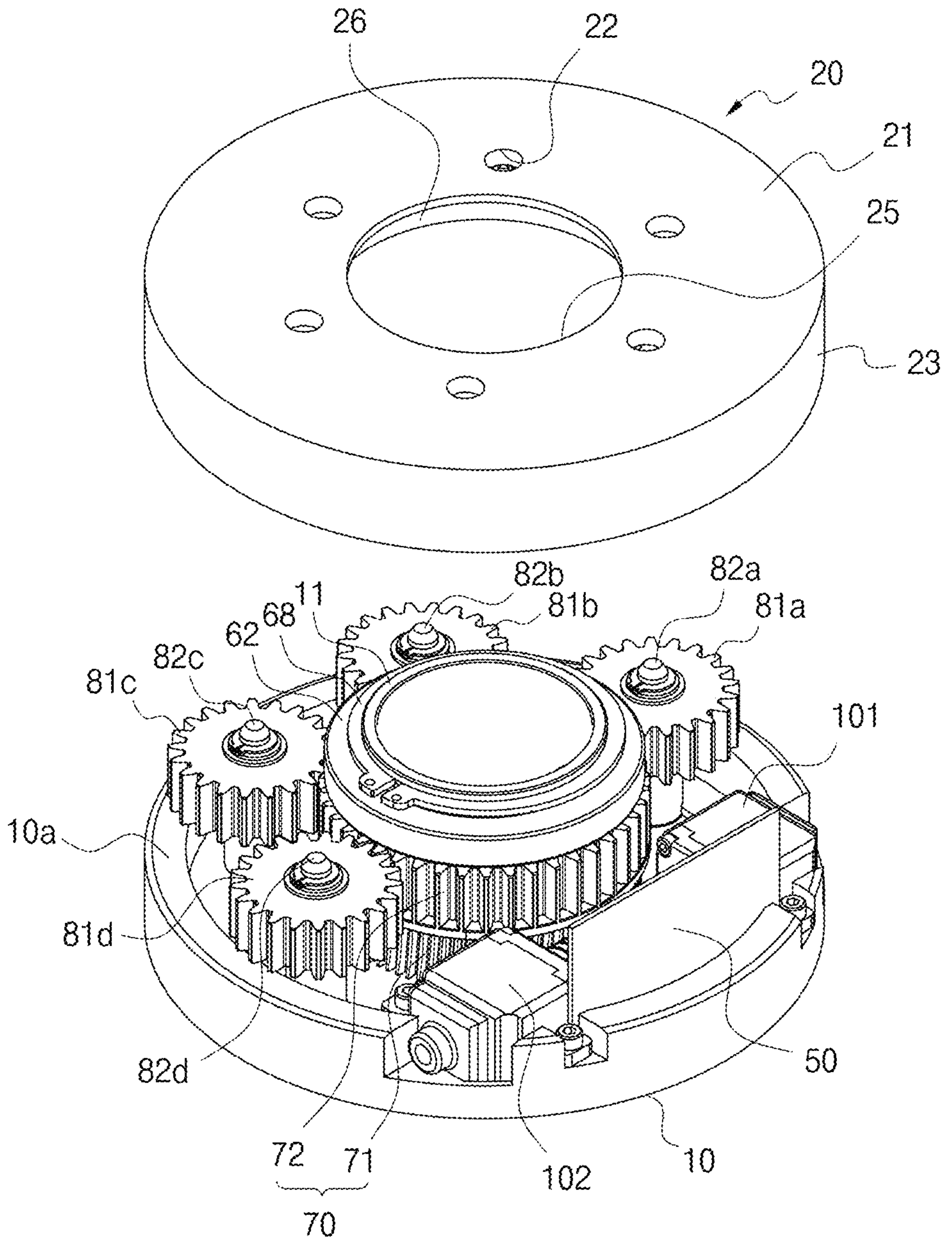

【FIG. 5】
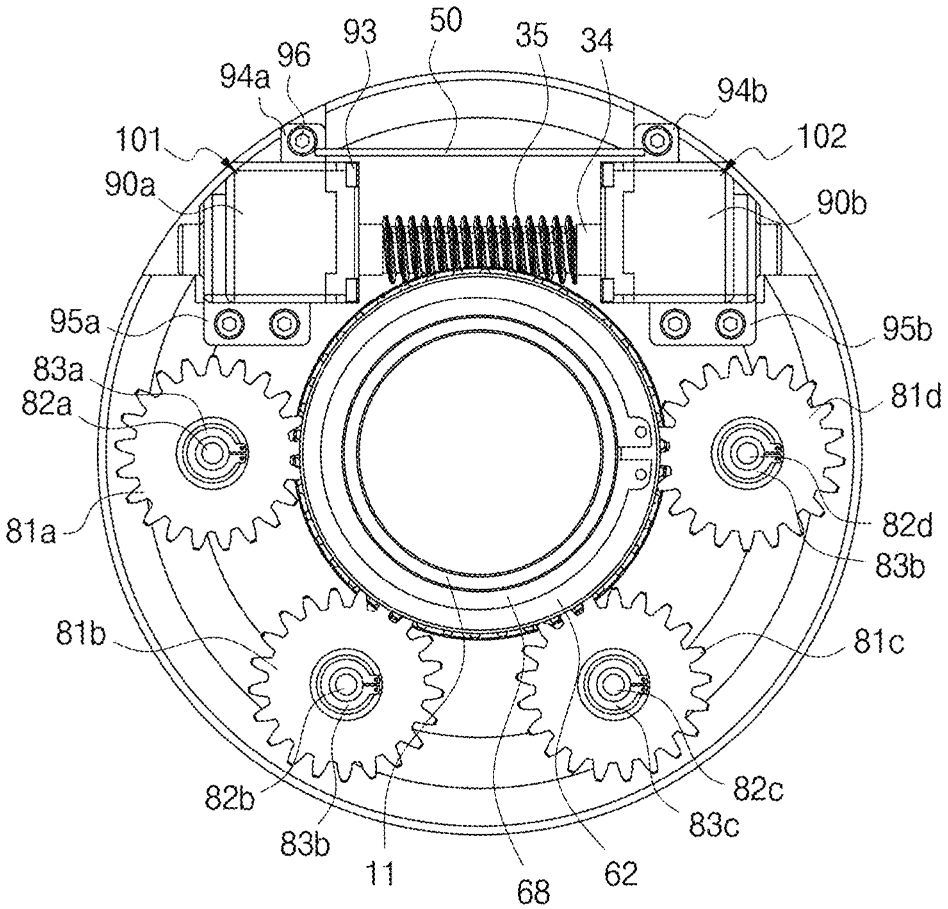

【FIG. 6】
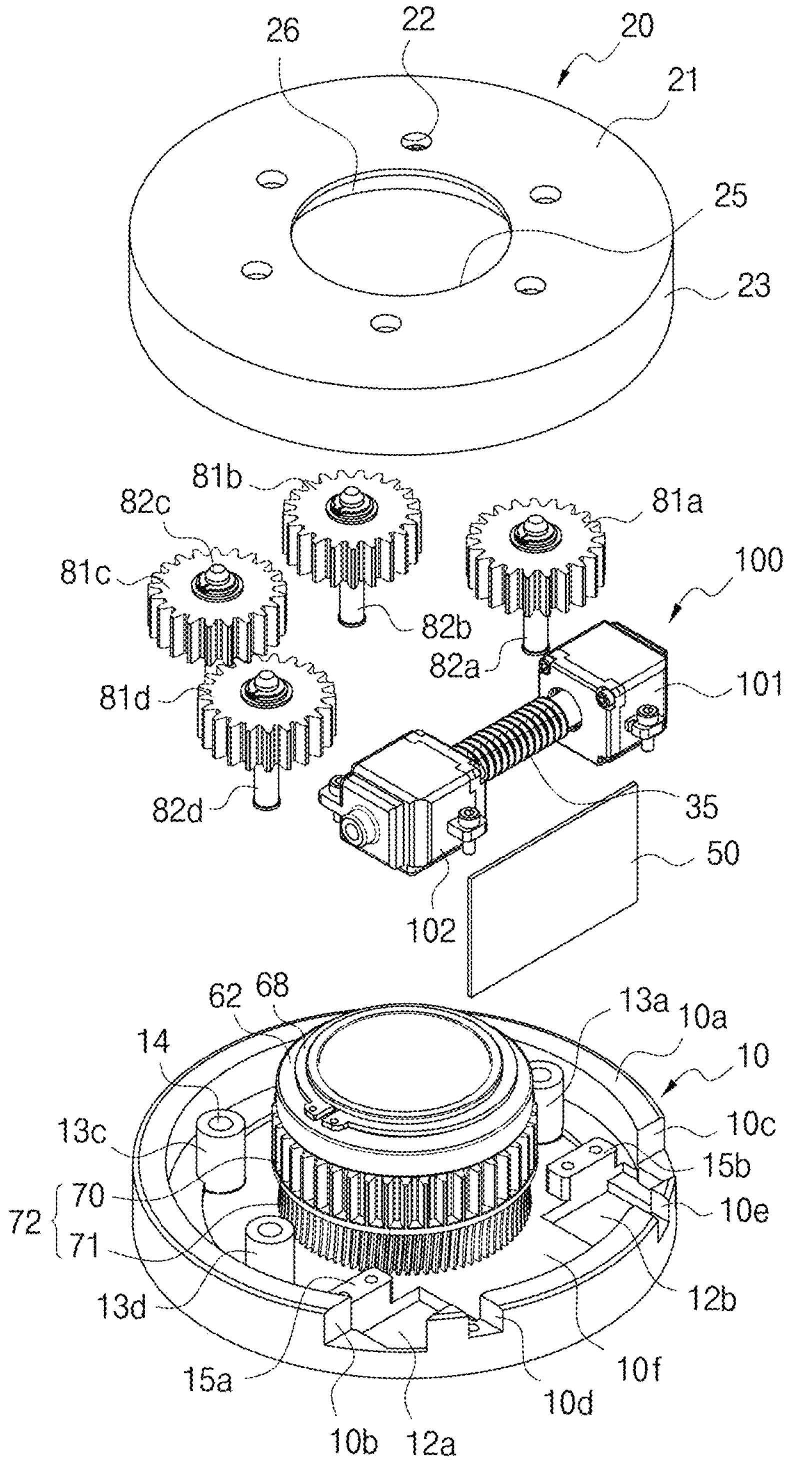

【FIG. 7】
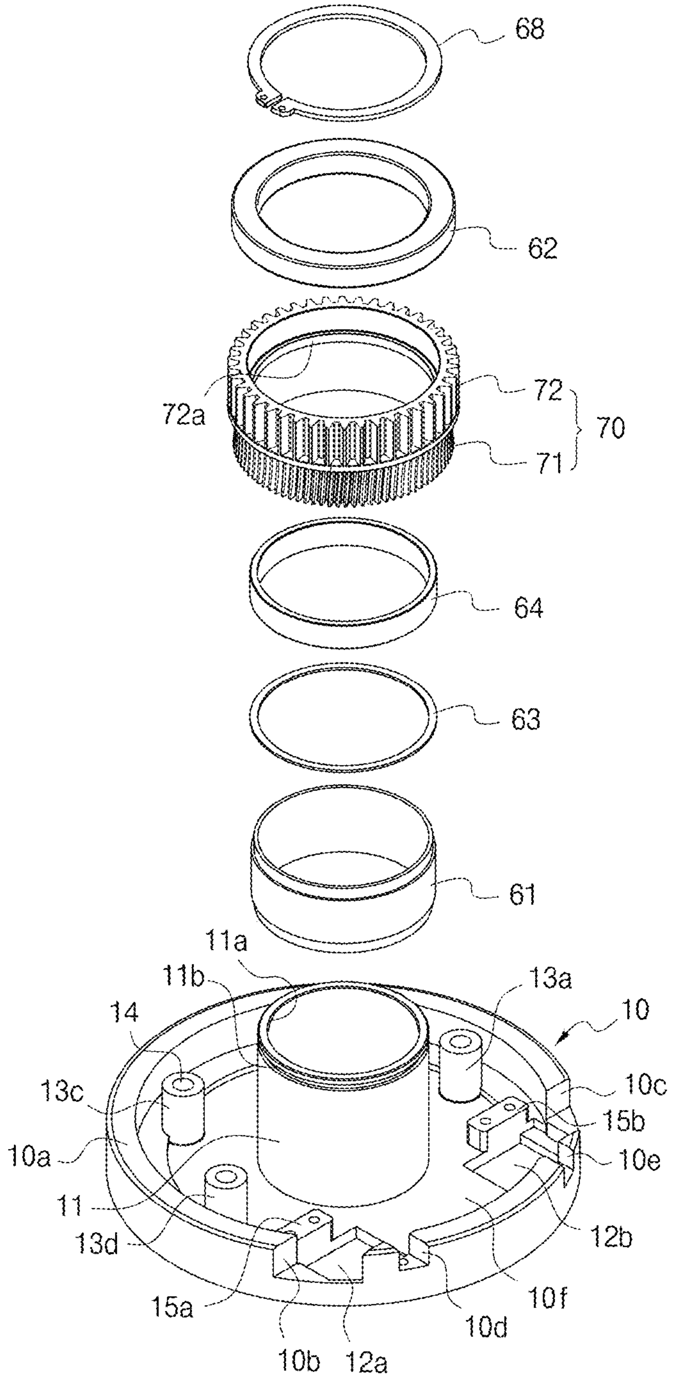

【FIG. 8A】
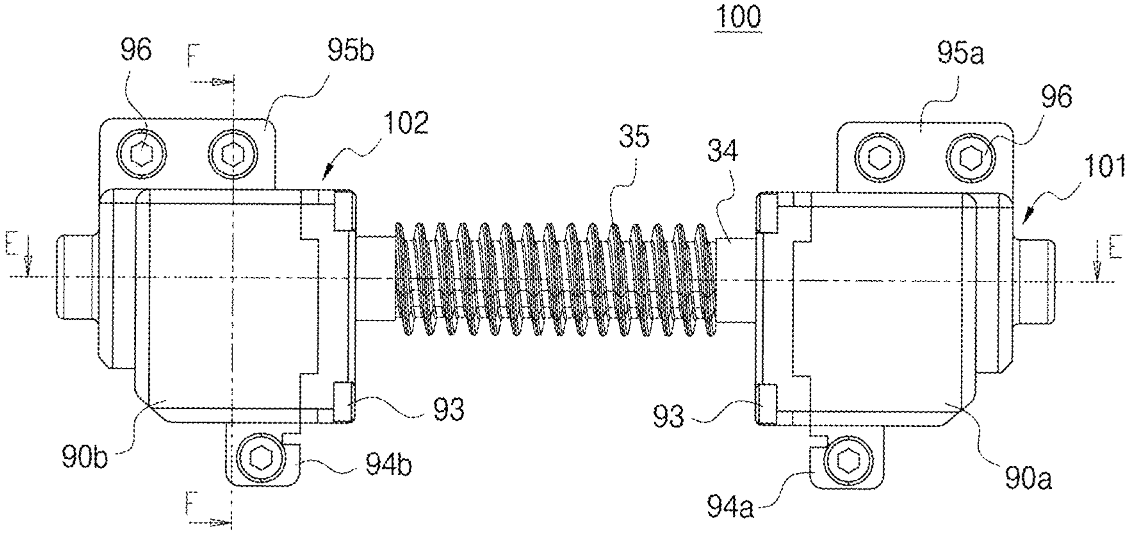
【FIG. 8B】
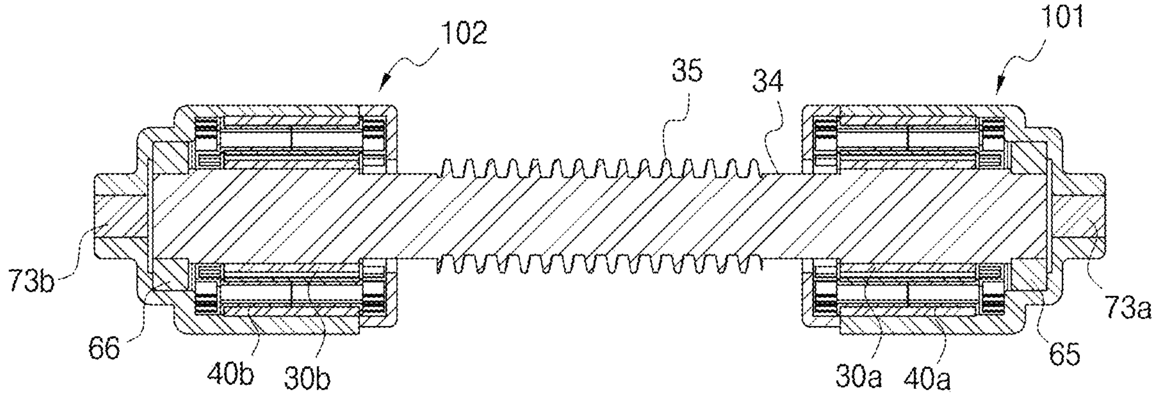

【FIG. 8C】
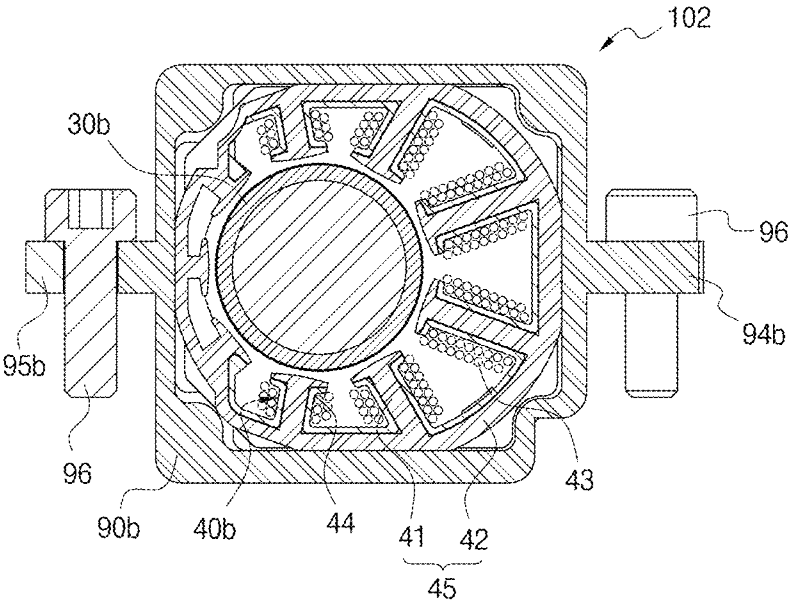
【FIG. 8D】
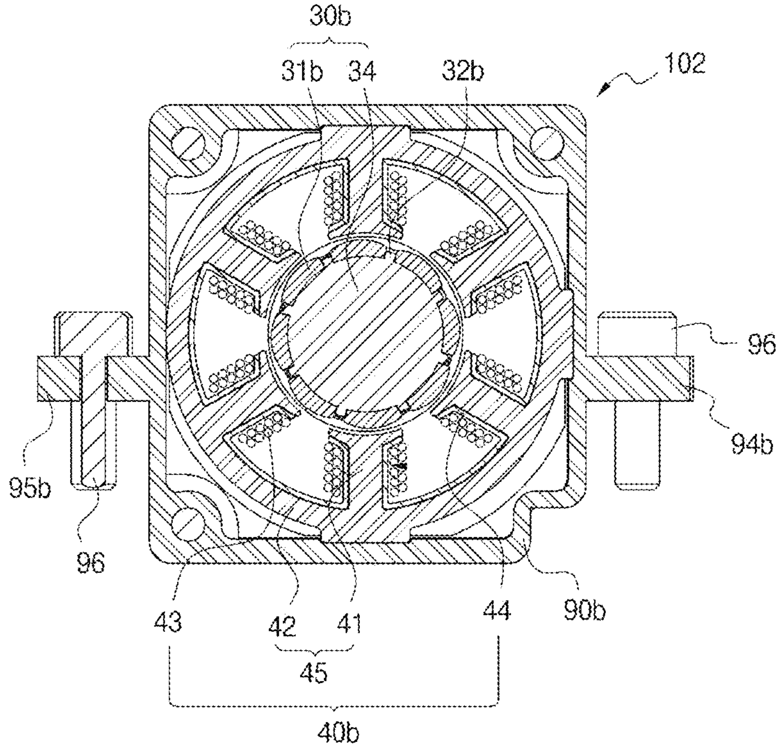

【FIG. 8E】
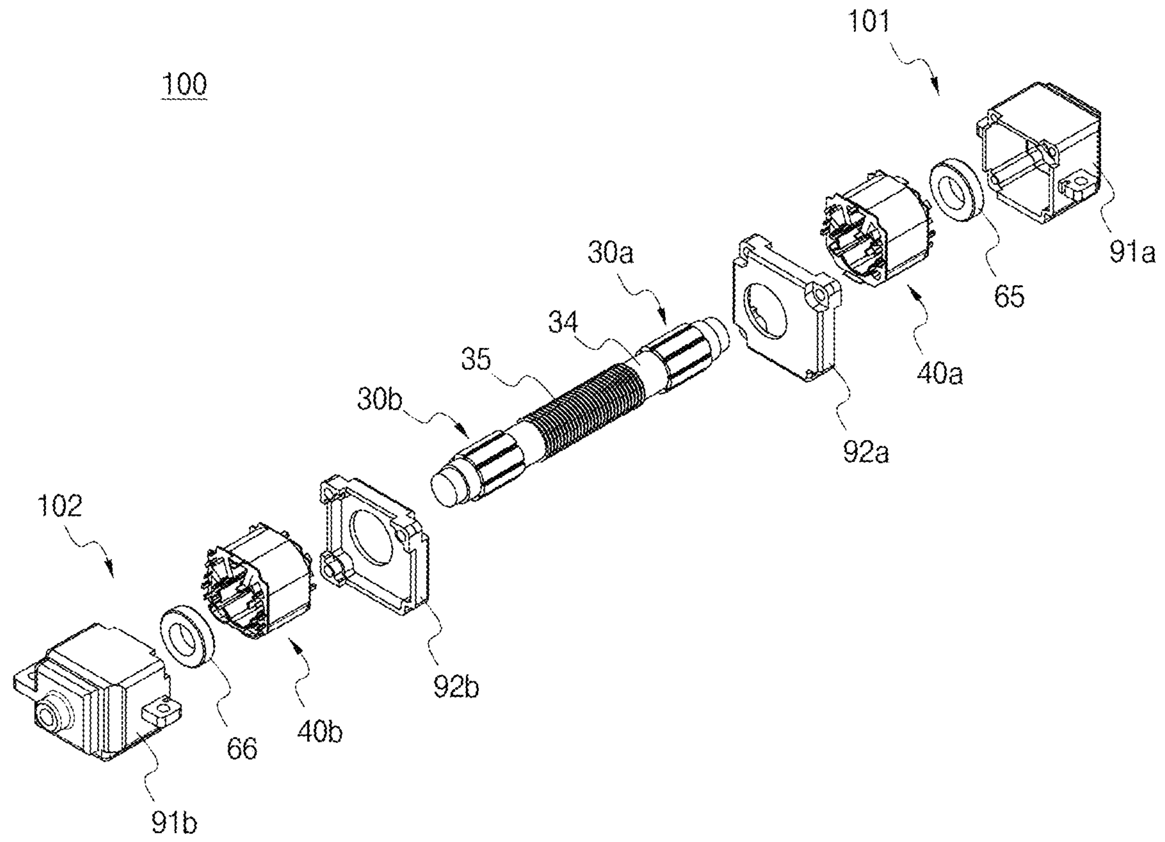

【FIG. 8F】
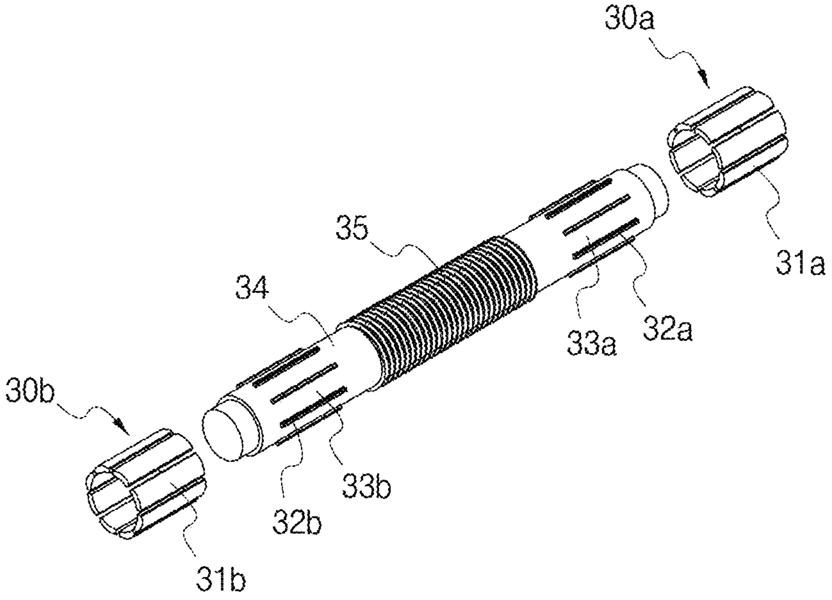

MOTOR DRIVE MECHANISM AND HOLLOW SWIVEL ACTUATOR USING SAME

TECHNICAL FIELD

The present invention relates to a hollow swivel actuator, and more particularly, to a motor drive mechanism capable of supporting a large load by driving a worm gear arranged at a central portion of a rotary shaft by two motors installed at both ends of the rotary shaft to stably drive a sun gear, and a hollow swivel actuator using same.

BACKGROUND ART

An electric actuator rotates or linearly moves a passive object to be driven with a high torque rotational power obtained by torque conversion of the rotational power generated from a rotating power source.

Meanwhile, in recent years, a swivel actuator has been used to rotate a main body of a driven object (i.e., a car seat) from side to side along with a rotary table as an actuator for rotating a vehicle car seat from side to side.

Considering that conventional actuators use direct-current (DC) motors lying inside low-height housing, a swivel actuator with a compact and slim structure, by installing a core motor-type brushless direct-current (BLDC) motor vertically on the bottom of the housing and installing a reduction gear train on the top thereof is proposed in Korean Patent Application Publication No. 10-2022-0056821 (Patent Document 1).

However, Patent Document 1 has a problem in that a housing structure is complex and the overall slim structure cannot be realized as a drive motor is placed at the bottom of the housing, a reducer is placed at the middle end thereof, and a rotary table is placed at the top thereof.

In addition, various types of reducers are applied for torque conversion, among which a cycloid type reducer has the advantages of high reduction ratio and low backlash compared to size, but due to its complex structure, mass productivity is poor and miniaturization and slim structure cannot be realized.

Further, in the related art, since the rotational power is provided to the gear terminal of the reducer through the worm gear integrally formed with the output shaft by using one drive motor arranged at the side of the reducer, when the drive motor is assembled to a reducer gear module, the outer shape of an actuator increases toward a side, and when the force is received, the output shaft of the drive motor is biased to the side, and thus the force may not be supported.

DISCLOSURE

Technical Problem

To solve the conventional art problems, it is an objective of the present invention to provide a motor drive mechanism capable of supporting a large load by driving a worm gear arranged at a central portion of a rotary shaft by two motors installed at both ends of the rotary shaft to stably drive a sun gear, and a hollow swivel actuator using same.

It is another objective of the present invention to provide a motor drive mechanism capable of realizing a slim structure by arranging the motor drive mechanism and a reduction gear unit on the same plane inside a cylindrical housing, and a hollow swivel actuator using same.

It is another objective of the present invention to provide a hollow swivel actuator that provides a structure capable of preventing damage even if a large external force is applied by stably accommodating and supporting a motor housing of a motor drive mechanism in an actuator housing.

It is another objective of the present invention to provide a hollow swivel actuator capable of increasing a degree of freedom of design by arranging a motor drive mechanism on one side of a bottom surface of an actuator housing and eccentrically arranging a plurality of pinion gears on the other side of the bottom surface of the actuator housing at regular intervals on the same circumference around a sun gear.

It is another objective of the present invention to provide a hollow swivel actuator capable of removing tolerance generated when coupling between gears and enabling a backlash to be zero by suppressing left and right displacements in a bearing housing by using a set screw on both ends of a common rotary shaft of a motor drive mechanism.

It is another objective of the present invention to provide a motor drive mechanism for driving a plurality of drive motors using a single motor drive circuit (i.e., a motor controller), and a hollow swivel actuator using same.

Technical Solution

According to an aspect of the present invention, there is provided a motor drive mechanism for a hollow swivel actuator including: a rotary shaft in which a worm gear, in which a rotational output of a motor is generated, is integrally formed at a central portion thereof; and first and second drive motors formed at both ends of the rotary shaft, respectively, wherein the first and second drive motors include: first and second motor housings for accommodating both ends of the rotary shaft, respectively; first and second rotors having magnets attached to outer circumferential portions of both end portions of the rotary shaft, respectively; first and second stators arranged on the outer sides of the first and second rotors with air gaps and generating rotating magnetic fields to rotate the rotary shaft of the first and second rotors, respectively.

The motor drive mechanism according to the present invention may further include first and second bearings installed inside the first and second motor housings to rotatably support the rotary shaft.

In addition, the motor drive mechanism according to the present invention may further include first and second set screws screw-coupled and assembled at both ends of the first and second motor housings, respectively, to cause leading end portions to press and support the end portions of the rotary shaft and to suppress the flow of the rotary shaft.

Both end portions of the first and second motor housings may be assembled to partially overlap first and second concave grooves formed on a circular wall of an actuator housing, and the first and second set screws may be manipulated using a driver from the outside.

In addition, the first and second motor housings may include: first and second motor housing bodies forming inner spaces in which the first and second rotors and the first and second stators are accommodated, respectively; and first and second motor housing covers coupled to entrances of the first and second motor housing bodies, respectively.

Moreover, the first and second motor housings in the motor drive mechanism according to the present invention may further include first and second brackets protruding inside and outside and used to fix the first and second motor housings to the actuator housing, respectively.

The first bracket protruding from the outside of each of the first and second motor housings may be assembled and fixed to overlap third and fourth concave grooves formed in the circular wall of the actuator housing, and the second bracket protruding from the inside of each of the first and second motor housings may be fixed to each of first and second protruding fixing parts protruding from the bottom surface of the actuator housing.

Further, the motor drive mechanism according to the present invention may further include first and second through-holes in which the first and second motor housings are assembled such that the bottom surfaces of the first and second motor housings are flush with the rear surface of the actuator housing when the first and second motor housings are assembled to the bottom surface of the actuator housing.

In this case, the rotary shaft is divided into three or two central portions where the first and second rotors and the worm gear are formed, and may be assembled using a D-cut structure.

Each of the first and second stators includes: a stator core having a plurality of teeth each having a "T" shape and a back yoke interconnected with the plurality of teeth to form a magnetic circuit; a bobbin integrally formed to surround an outer circumferential surface on which a coil of each of the plurality of teeth is wound; and a coil wound around the outer circumferential surface of the bobbin, wherein the plurality of teeth and the back yoke may have an asymmetric structure.

According to another aspect of the present invention, there is provided a hollow swivel actuator including: an actuator housing having a hollow cylindrical part protruding upward at a center thereof; a motor drive mechanism arranged on one side of the bottom surface of the actuator housing, having first and second drive motors formed at both ends of a common rotary shaft, respectively, and having a worm gear integrally formed at the center of the rotary shaft to generate rotational outputs of the first and second drive motors; a sun gear rotatably supported on an outer circumference of the hollow cylindrical part, having a worm wheel, which is gear-coupled to the worm gear at a lower side thereof so as to perform a primary reduction, and having a spur gear integrally formed on an upper side thereof so as to transmit a rotational output of the worm wheel; a plurality of pinion gears each arranged on the other side of the bottom surface of the actuator housing at intervals on the same circumference around the sun gear and gear-coupled to the spur gear of the sun gear and rotating; and a rotary table in which a central portion thereof is rotatably supported on an outer circumference of the hollow cylindrical part, and the plurality of pinion gears are gear-coupled to a ring gear integrally formed inside a side portion to perform a secondary reduction.

The swivel actuator according to the present invention may further include: a first bearing arranged between the bottom end of the hollow cylindrical part and the sun gear to rotatably support the sun gear; a second bearing rotatably supporting the rotary table on an outer circumference of a top end of the hollow cylindrical part; and a bearing support press-coupled to the outer circumference of the hollow cylindrical part and arranged between the first bearing and the second bearing.

In this case, the first bearing may include a needle roller bearing, and the second bearing may include a ball bearing.

In addition, the first and second drive motors and the plurality of pinion gears of the motor drive mechanism may be arranged on the same plane on the bottom surface of the actuator housing.

The swivel actuator according to the present invention may further include a motor drive circuit mounted on a printed circuit board (PCB) installed inside the actuator housing to apply a motor drive signal to the first and second drive motors according to manipulation of a user's car seat control button, and the rotary table may be used for rotation driving of a car seat.

Advantageous Effects

As described above, in the present invention, a large load may be supported by stably driving a sun gear through the driving of a worm gear arranged at the center of the rotary shaft by means of two motors installed at both ends of the rotary shaft.

Further, in the present invention, a slim structure may be realized by arranging a motor drive mechanism and a reduction gear unit on the same plane inside a cylindrical housing.

Furthermore, in the present invention, it is possible to prevent damage even if a large external force is applied by stably accommodating and supporting a motor housing of a motor drive mechanism in an actuator housing.

In the present invention, a degree of freedom of design may be increased by arranging a motor drive mechanism on one side of a bottom surface of an actuator housing and eccentrically arranging a plurality of pinion gears on the other side of the bottom surface of the actuator housing at intervals on the same circumference around a sun gear.

In addition, in the present invention, both ends of a common rotary shaft of the motor drive mechanism are used to suppress left and right displacements in a bearing housing by using a set screw, thereby eliminating tolerance generated during coupling between gears and making a backlash zero.

Moreover, in the present invention, the length of one motor is divided into two parts, and two bearings are arranged at both ends of a rotary shaft, thereby realizing a structure capable of achieving uniform distribution of force and stably accommodating force.

In addition, in the present invention, a worm gear is arranged at the central portion of a rotary shaft rotated by first and second drive motors to drive a sun gear, thereby having a more stable structure against vibration and noise.

The first and second drive motors are formed in first and second motor housings fixedly installed at one side of the actuator housing, and both ends of the rotary shaft are rotatably supported by a pair of bearings arranged inside the first and second motor housings, thereby providing stability when driving the worm gear.

Further, the present invention provides a motor drive mechanism for driving a plurality of drive motors using a single motor drive circuit (i.e., a motor controller).

BRIEF DESCRIPTION OF THE DRAWINGS

FIGS. 1 and 2 are respectively a perspective view and a plan view of a hollow swivel actuator according to a preferred embodiment of the present invention.

FIGS. 3A to 3D are cross-sectional views taken along line A-A, line B-B, line C-C, and line D-D of FIG. 2, respectively.

FIG. 4 is an exploded perspective view illustrating that a rotary table is separated from a hollow swivel actuator according to a preferred embodiment of the present invention, and FIG. 5 is a plan view of FIG. 4 in which the rotary table has been removed.

FIGS. 6 and 7 are a module-each exploded perspective view and a fully exploded perspective view of a hollow swivel actuator according to a preferred embodiment of the present invention, respectively.

FIG. 8A is a plan view of a motor driving device according to a preferred embodiment of the present invention, FIG. 8B is a cross-sectional view taken along line F-F of FIG. 8A, FIGS. 8C and 8D are cross-sectional views taken along line G-G of FIG. 8A, FIG. 8E is an exploded perspective view, and FIG. 8F is an exploded perspective view of a rotary shaft and a magnet.

BEST MODE FOR CARRYING OUT THE INVENTION

Hereinafter, embodiments of the present disclosure will be described in detail with reference to the accompanying drawings.

The sizes and shapes of the components shown in the drawings may be exaggerated for clarity and convenience. In addition, terms defined in consideration of the configuration and operation of the present disclosure may vary depending on the intention or custom of the user, the operator, and the like. Definitions of these terms should be based on the content of this specification.

A hollow swivel actuator according to the present invention is used, together with a rotary table, to rotate a driven body, that is, a vehicle car seat, left and right. When a swivel actuator is installed in a lower plate fixed to a bottom surface of a vehicle and a car seat is fixedly installed in a rotary table, the car seat may also be rotated according to the rotation of the rotary table.

In the following description, a hollow swivel actuator that drives a car seat as a driven body using a BLDC-type drive motor as a power source is described.

In the hollow swivel actuator according to the present invention, a single actuator housing, a motor drive mechanism, a sun gear, a plurality of pinion gears are arranged inside the actuator housing, and a rotary table in which a ring gear is integrally formed is arranged on an upper portion of the actuator housing, to achieve miniaturization and slimness while solving the problems of the prior art.

In addition, a hollow swivel actuator according to the present invention is formed in a disc shape, and includes a through-hole for withdrawing a cable, which is formed in a central portion thereof as an inner hollow shape, and a plurality of coupling holes, for example, three to six coupling holes, which are formed on an upper portion of a rotating body (a rotary table) so as to be connected to a passive object, in which a bottom end portion of a fixing bolt passes through each of the coupling holes so as to be screw-coupled to and fixed to a stud nut fixedly installed on an inner surface of the rotary table.

Referring to FIGS. 1 to 7, a hollow swivel actuator 200 according to a preferred embodiment of the present invention includes: an actuator housing 10 having a hollow cylindrical part 11 protruding upward at a center thereof; a motor drive mechanism 100 arranged on one side of the bottom surface 10*f* of the actuator housing 10, having first and second drive motors 101 and 102 formed at both ends of a common rotary shaft 34, respectively, and having a worm gear 35 integrally formed at the center of the rotary shaft 34 to generate rotational outputs of the first and second drive motors 101 and 102; a sun gear 70 rotatably supported on an outer circumference of the hollow cylindrical part 11, having a worm wheel 71, which is gear-coupled to the worm gear 35 at a lower side thereof so as to perform a primary reduction, and having a spur gear 72 integrally formed on an upper side thereof so as to transmit a rotational output of the worm wheel 71; a plurality of pinion gears 81*a* to 81*d* each arranged on the other side of the bottom surface 10*f* of the actuator housing 10 at intervals on the same circumference around the sun gear 70 and gear-coupled to the spur gear 72 of the sun gear 70 and rotating; and a rotary table 20 in which a central portion thereof is rotatably supported on an outer circumference of the hollow cylindrical part 11, and the plurality of pinion gears 81*a* to 81*d* are gear-coupled to a ring gear 24 integrally formed inside a side portion to perform a secondary reduction.

Hereinafter, the hollow swivel actuator 200 will be described in detail.

First, the hollow cylindrical part 11 having a through-hole 11*a* formed at the center thereof protrudes from a center of the actuator housing 10, and a circular wall 10*a* protrudes from an outer circumferential portion of the hollow cylindrical part 11. First and second concave grooves 10*b* and 10*c*, which are cut so that the first and second motor housings 90*a* and 90*b* are partially overlapped when the first and second drive motors 101 and 102 of the motor drive mechanism 100 are installed, are respectively arranged to be spaced apart from each other at intervals on both sides of the circular wall 10*a*, and third and fourth concave grooves 10*d* and 10*e* for fixing the first and second motor housings 90*a* and 90*b* to the circular wall 10*a* of the actuator housing 10 by using fixing bolts 96 are arranged at adjacent portions of the first and second concave grooves 10*b* and 10*c*.

In addition, both ends of the first and second motor housings 90*a* and 90*b* have stepped portions formed toward the rear end portions thereof, and stepped portions corresponding to the stepped portions of the first and second motor housings 90*a* and 90*b* are also formed inwards in the circular wall 10*a* on which the first and second concave grooves 10*b* and 10*c* are formed. Therefore, a contact area between each of the first and second motor housings 90*a* and 90*b* and the actuator housing 10 is increased to stably support the first and second motor housings 90*a* and 90*b*.

When the first and second motor housings 90*a* and 90*b* are installed in the actuator housing 10, first and second through-holes 12*a* and 12*b* are formed on the bottom surface 10*f* of the actuator housing 10, and the first and second motor housings 90*a* and 90*b* are assembled such that the bottom surfaces of the first and second motor housings 90*a* and 90*b* are flush with the rear surface of the actuator housing 10, to thereby reduce the thickness of the swivel actuator 200 as much as possible.

First and second brackets 94*a* and 94*b* may protrude from one side of the first and second motor housings 90*a* and 90*b*, respectively, and one fixing bolt 96 may be fastened to each of the first and second brackets 94*a* and 94*b* such that the first and second brackets 94*a* and 94*b* are fixed to the third and fourth concave grooves 10*d* and 10*e*, respectively.

In addition, third and fourth brackets 95*a* and 95*b* protrude from the other sides of the first and second motor housings 90*a* and 90*b*, respectively, and first and second protruding fixing portions 15*a* and 15*b* for fixing motors corresponding to the third and fourth brackets 95*a* and 95*b* protrude from the bottom surface 10*f* of the actuator housing 10. Through-holes are formed in the third and fourth brackets 95*a* and 95*b* to fasten at least two fixing bolts 96 to the first and second protruding fixing portions 15*a* and 15*b*.

Furthermore, a plurality of support shafts 82*a* to 82*d* are installed on the other side of the bottom surface 10*f* of the actuator housing 10 to rotate the plurality of pinion gears 81*a* to 81*d* arranged at intervals on the same circumference with respect to the sun gear 70, and the plurality of support shafts 82*a* to 82*d* are respectively fixed to a plurality of protrusions 13*a* to 13*d* protruding from the bottom surface 10*f* of the actuator housing 10.

In this case, the plurality of support shafts 82*a* to 82*d* are assembled through the through-holes of the plurality of protrusions 13*a* to 13*d* from the bottom surface 10*f* of the actuator housing 10, and stopper insertion concave grooves 84 are formed on the top ends of the support shafts 82*a* to 82*d*. Accordingly, a plurality of stoppers 83*a* to 83*d* may be coupled to the stopper insertion concave grooves 84 to prevent the pinion gears 81*a* to 81*d* from being separated after the pinion gears 81*a* to 81*d* have been assembled.

As will be described later, a pair of bearings 65 and 66 for rotatably supporting a common rotary shaft 34 of the first and second drive motors 101 and 102 are embedded inside both ends of the first and second motor housings 90*a* and 90*b*.

In this case, it is preferable to prevent the first and second motor housings 90*a* and 90*b* supporting the pair of bearings 65 and 66 from being bent or damaged due to a large external pressure by using the worm gear 35 to increase the brake torque when the motor drive mechanism 100 generates the rotational output. To this end, the present invention is designed to disperse external pressure while firmly supporting the first and second motor housings 90*a* and 90*b* in the actuator housing 10.

In the present invention, in order to prevent bending or damage of the first and second motor housings 90*a* and 90*b* due to a large external pressure, the first and second drive motors 101 and 102 of the motor drive mechanism 100 are assembled such that both ends of the first and second motor housings 90*a* and 90*b* partially overlap the first and second concave grooves 10*b* and 10*c*, respectively, the first and second brackets 94*a* and 94*b* are fixed to the third and fourth concave grooves 10*d* and 10*e* using fixing bolts 96, respectively, and third and fourth brackets 95*a* and 95*b* are fixed to the first and second protruding fixing portions 15*a* and 15*b* using at least two fixing bolts 96.

For example, the motor drive mechanism 100 generates relatively high-speed rotational power, and the sun gear 70 and the plurality of pinion gears 81*a* to 81*d* receive the high-speed rotational power, reduce the rotational speed, and transfer the reduced rotational speed to the rotational table 20, to thereby convert torque and generate reduced rotational power with increased torque.

In the motor drive mechanism 100, as shown in FIGS. 8A to 8F, the first and second drive motors 101 and 102 are formed at both ends of the common rotary shaft 34, respectively, and the worm gear 35 that generates the rotational outputs of the first and second drive motors 101 and 102 is integrally formed in the center of the rotary shaft 34. As a result, the worm gear 35 is formed in the center of the rotary shaft 34 rotated by the first and second drive motors 101 and 102 having a symmetrical structure and is gear-coupled to the worm wheel 71 of the sun gear 70.

In the related art, since the rotational power is provided to the gear terminal of the reducer through the worm gear integrally formed with the output shaft by using one drive motor arranged at the side of the reducer, when the drive motor is assembled to a reducer gear module, the outer shape of an actuator increases toward a side, and when the force is received, the output shaft of the drive motor is biased to the side, and thus the force may not be supported.

However, in this invention, a large load may be supported by stably driving the sun gear 70 by driving the worm gear 35 placed at the center of the rotary shaft 34 by the first and second drive motors 101 and 102 installed at both ends of the rotary shaft 34.

The first and second drive motors 101 and 102 are formed inside the first and second motor housings 90*a* and 90*b* fixedly installed on one side of the actuator housing 10, and both ends of the rotary shaft 34 are rotatably supported by the pair of bearings 65 and 66 arranged inside the first and second motor housings 90*a* and 90*b*, providing stability when driving the worm gear 35.

As described above, in this invention, the length of one motor is divided into both sides, and two bearings 65 and 66 are arranged at both ends of the rotary shaft 34 to thereby realize a structure capable of achieving the uniform distribution of force and stably accommodating force.

In addition, in this invention, the worm gear 35 is placed in the center of the rotary shaft 34 rotated by the first and second drive motors 101 and 102 to drive the sun gear 70 to have a more stable structure against vibration and noise.

As the first and second drive motors 101 and 102 are arranged inside one side of the actuator housing 10, the shape of the actuator housing may have a cylindrical shape as a whole.

Moreover, in this invention, as shown in FIG. 8B, both ends of the first and second motor housings 90*a* and 90*b* may limit the left and right flow of the rotary shaft 34 by adding set screws 73*a* and 73*b* therein, respectively, while serving as bearing housings.

Each of the set screws 73*a* and 73*b* may have a male thread formed on the outer circumference of the body, a "–" or "+" concave groove may be formed at the rear end portion to accommodate the front end of the driver, and the front end thereof may be curved or flat.

The rear ends of the first and second motor housings 90*a* and 90*b* each have a shape that gradually narrows to serve as a bearing housing, and a female thread is formed in a through-hole penetrating from both ends to the inside. The set screws 73*a* and 73*b* may be screw-coupled to the rear ends of the first and second motor housings 90*a* and 90*b* in which female threads are formed, and the front ends of the two set screws 73*a* and 73*b* may be combined in a form of pushing and compressing both ends of the rotary shaft 34.

The set screws 73*a* and 73*b* are preferably installed in both the bearing housings of the two bearings 65 and 66 that rotatably support both ends of the rotary shaft 34. However, the set screws 73*a* and 73*b* may be installed only in one bearing housing to support one end of the rotary shaft, thereby suppressing the left and right flow by pushing the rotary shaft 34 in one direction.

In the motor drive mechanism 100, as shown in FIGS. 8A to 8F, the first and second drive motors 101 and 102 are formed at both ends of the common rotary shaft 34, respectively, and are arranged in the first and second motor housings 90*a* and 90*b*, respectively.

The first and second motor housings 90*a* and 90*b* are assembled so that both ends thereof partially overlap the first and second concave grooves 10*b* and 10*c* of the actuator housing 10, and the both ends are exposed to the outside. As a result, the set screws 73*a* and 73*b* may be manipulated using a driver from the outside, thereby limiting the left and right flow of the rotary shaft 34.

The first and second motor housings 90*a* and 90*b* include: first and second motor housing bodies 91*a* and 91*b* forming internal spaces in which first and second rotors 30*a* and 30*b* and first and second stators 40*a* and 40*b* are accommodated, respectively; and first and second motor housing covers 92*a* and 92*b* coupled to the entrances of the first and second motor housing bodies 91*a* and 91*b*, respectively, and the first and second motor housings 90*a* and 90*b* are fastened and fixed to the first and second motor housing bodies 91*a* and 91*b* and the first and second motor housing covers 92*a* and 92*b* by using a plurality of fixing bolts 93.

The first and second drive motors 101 and 102 have first and second rotors 30*a* and 30*b* formed at both ends of the rotary shaft 34, respectively, and first and second stators 40*a* and 40*b* which are arranged with an air gap therebetween outside the first and second rotors 30*a* and 30*b* thereby generating a rotating magnetic field, to rotate the first and second rotors 30*a* and 30*b*.

The first and second rotors 30*a* and 30*b* include respective magnets 31*a* and 31*b* attached to the outer circumferential portions of both ends of the rotary shaft 34. The magnets 31*a* and 31*b* may include a plurality of N-pole and S-pole split magnet segments, or may use a magnet in which the N-pole and S-pole are split and magnetized into multiple poles in a ring-shaped magnet.

When the first and second rotors 30*a* and 30*b* include split magnet segments of a plurality of N poles and S poles, a plurality of protrusions 32*a* and 32*b* protrude along the outer circumference at both ends of the rotary shaft 34, respectively, a plurality of concave grooves 33*a* and 33*b* to which the plurality of magnets 31*a* and 31*b* may be attached are formed between the plurality of protrusions 32*a* and 32*b*, and the plurality of magnets 31*a* and 31*b* are arranged in the plurality of concave grooves 33*a* and 33*b*.

As shown in FIGS. 8A to 8F, in the common rotary shaft 34 of the first and second rotors 30*a* and 30*b*, the worm gear 35 may be integrally processed in the center thereof, the plurality of magnets 31*a* and 31*b* may be fixedly arranged at both ends thereof, and two magnets may be simultaneously magnetized.

In addition, the common rotary shaft 34 may be divided into three or two central portions in which the first and second rotors 30*a* and 30*b* and the worm gear 35 are formed, and then may be assembled using a D-cut structure or another connection method.

Each of the first and second stators 40*a* and 40*b* includes: a stator core 45 having a plurality of teeth 41 each having a "T" shape and a back yoke 42 interconnected with the plurality of teeth 41 to form a magnetic circuit; a bobbin 44 made of an insulating material integrally formed to surround an outer circumferential surface on which a coil 43 of each of the plurality of teeth 41 is wound; and the coil 43 wound around the outer circumferential surfaces of the bobbin 44. The bobbin 44 may be integrally formed as a stator support.

In this case, the bobbin 44 may include upper and lower insulators assembled to surround the back yoke 42 from the top and bottom portions along with the plurality of teeth 41.

In this case, as shown in FIG. 8D, each of the first and second stators 40*a* and 40*b* may have a stator core 45 having a symmetrical structure in which a plurality of teeth 41 protrude from the annular back yoke 42 in a center direction thereof, and as illustrated in FIG. 8C, each of the first and second stators 40*a* and 40*b* may have a stator core 45 having an asymmetrical structure in which a plurality of teeth 41 have different lengths and protrude from the back yoke 42 having an asymmetrical structure in the center direction thereof.

The first and second stators 40*a* and 40*b* having the stator core 45 having the asymmetrical structure may be used to provide a motor structure for maximally utilizing a space inside the actuator housing 10. That is, as shown in FIG. 8A, the first and second stators 40*a* and 40*b* having the stator core 45 having the asymmetrical structure may be applied when the lengths of the plurality of teeth 41 of the stator are extended and the winding amount of the coil 43 is increased, by using the space of the outer side (i.e., the lower side of FIG. 8A) of the rotary shaft 34.

As shown in FIGS. 4 to 6, the motor drive mechanism 100 may include a printed circuit board (PCB) 50 on which one motor drive circuit (i.e., a motor controller) having a Hall sensor assembly is mounted at an intermediate portion between the first and second drive motors 101 and 102.

In the swivel actuator 200 according to the present invention, the first and second drive motors 101 and 102 constituting the motor drive mechanism 100 may be configured as a brushless direct-current (BLDC) motor having an 8 pole-6 slot structure, as shown in FIG. 8D. In this case, when coils 43 of the first and second stators 40*a* and 40*b* are wound around the plurality of teeth 41, in the first and second drive motors 101 and 102, the coils 43 may be wound around the plurality of teeth 41 in a three-phase (U, V, W) structure, and the other ends of the three-phase (U, V, W) coils 43 may be connected to each other in a Y-connection or star-connection manner.

Furthermore, the first and second drive motors 101 and 102 may be driven by a 6-step full-wave drive method using an inverter after receiving a rotor position signal from two or three Hall sensors mounted on a Hall sensor assembly in a motor drive circuit.

The first and second drive motors 101 and 102 may be driven using one motor drive circuit (i.e., a motor controller).

In this case, U, V, and W coils 43 may be equally wound around the first and second stators 40*a* and 40*b* of the first and second drive motors 101 and 102, respectively, and the U-line and the W-line of the conductive patterns formed on the PCB 50 may be reversely connected.

That is, since one of the first and second drive motors 101 and 102 has the opposite rotational direction, two drive motors may be driven in the same direction when the U-line and the W-line are reversely connected with respect to one of the first and second stators 40*a* and 40*b*.

In this case, the positions of the first and second rotors 30*a* and 30*b* and the positions of the stator cores should be located on the same line. That is, one Hall sensor integrated circuit (IC) (i.e., a Hall sensor assembly) for detecting the rotational positions of the first and second rotors 30*a* and 30*b* is used to arrange the position of the rotor or the position of the stator core, and U, V, and W lines according to the rotation direction.

A method of driving the plurality of drive motors using one motor drive circuit (i.e., a motor controller) is summarized as follows.

First, when there are two or more drive motors, U, V, and W phases equally wound around the stator coils of the respective drive motors are wired.

Second, when two drive motors are located in a symmetrical direction, various types of drive motors are generated.

First, when two drive motors are located in the symmetrical directions, the rotation direction of the one drive motor and the rotation direction of the other drive motor positioned opposite to the rotation direction of the one drive motor should be reverse, and thus, the rotation directions of the two drive motors should be rotated in the same direction from the perspective of the rotary shaft.

When the two drive motors are located in the symmetrical direction, and when the two drive motors are wound in the same winding direction, the rotary shaft is rotated in the same direction by equally winding the winding wires, and connecting the U-phase, the V-phase, and the W-phase to each other using the conductive pattern formed on the PCB 50, for motor sharing.

When two drive motors are located in a symmetrical direction, the rotary shaft is rotated in the same direction by reversely winding one drive motor, and connecting the U-phase with the W-phase, the W-phase with the U-phase, and the V-phase with the V-phase, using the conductive pattern formed on the PCB 50.

When a high speed rotation output is generated through the worm gear 35 of the motor drive mechanism 100, the hollow swivel actuator 200 according to the present invention may obtain a stable high torque output as a large torque conversion is performed by a two-step reduction in which the ring gear 24 of the rotary table 20 is rotated through the sun gear 70 and the plurality of pinion gears 81*a* to 81*d*.

The sun gear 70 is rotatably supported on the outer circumference of the hollow cylindrical part 11, the worm wheel 71, which is gear-coupled to the worm gear 35, is arranged at a lower side thereof so as to perform a first reduction, and the spur gear 72, which transmits the rotational output of the worm wheel 71 to the plurality of pinion gears 81*a* to 81*d*, is integrally formed on an upper side thereof.

As shown in FIG. 7, a stepped portion 72*a* is formed at an inner circumferential portion of the spur gear 72, and a damper ring 63 and a bearing support 64 may be supported by the stepped portion 72*a*, as will be described later.

A needle roller bearing 61 having a cylindrical shape is inserted between a lower portion of the hollow cylindrical part 11 and the sun gear 70 to rotatably support the sun gear 70, and a table supporting bearing 62 is inserted between an upper portion of the hollow cylindrical part 11 and a central portion of the rotary table 20.

In addition, a bearing support 64 is inserted between the needle roller bearing 61 and the table support bearing 62, and is press-fitted into the outer circumference of the hollow cylindrical part 11 to prevent the table support bearing 62 from descending.

Further, a damper ring 63 is inserted into the lower portion of the bearing support 64 to absorb an impact that may be applied to the needle roller bearing 61 when the bearing support 64 is press-fitted into the outer circumference of the hollow cylindrical part 11.

First, the needle roller bearing 61 is a type of roller bearing capable of withstanding a large radial load compared to a general ball bearing, and includes an outer ring fixed to a movable part and an inner ring installed in a fixed part. In this case, a retainer and a plurality of needle-shaped rollers are inserted into the outer ring.

The inner ring of the needle roller bearing 61 is press-fitted into the outer circumference of the hollow cylindrical part 11, and the outer ring is fixed to the inner circumference of the sun gear 70.

In addition, the table support bearing 62 may be configured as a ball bearing having a plurality of balls inserted between an inner ring and an outer ring, wherein the inner ring is fixed to the outer circumference of the hollow cylindrical part 11 and the outer ring is fixed to a bearing housing 26 protruding downward from the center of the rotary table 20.

Furthermore, the hollow swivel actuator 200 has a stopper insertion concave groove 11*b* formed at the upper end portion of the hollow cylindrical part 11, and a stopper ring 68 is coupled to the stopper insertion concave groove 11*b* to prevent the rotary table 20 from being separated.

The rotary table 20 has the circular upper plate 21 and the side surface portion 23 extending downward from the outer circumference of the upper plate 21. The upper plate 21 has a plurality of coupling holes 22 which are penetratively formed for coupling with a main body, which is a passive body (e. g., electric seat) installed in the rotary table 20.

A central portion of the rotary table 20 is rotatably supported on an outer circumference of the hollow cylindrical part 11 by a table support bearing 62, and the plurality of pinion gears 81*a* to 81*d* are gear-coupled to a ring gear 24 integrally formed inside the side surface portion, so that a secondary reduction is performed and thus the rotary table 20 is rotated at a low speed.

A central through-hole 25 through which a cable passes is formed in the center of the upper plate 21, in which a motor driving signal according to the manipulation of a user's car seat control button in the first and second drive motors 101 and 102 constituting the motor drive mechanism 100 is transmitted to the PCB 50 of a motor drive circuit installed inside the actuator housing 10 through the cable.

In the illustrated embodiment, the PCB 50 of a motor drive circuit is installed in the actuator housing 10. However, the motor drive circuit may be installed outside the actuator housing 10, and a Hall sensor assembly may be mounted on the PCB 50 installed inside the housing to apply U, V, and W signals output from an inverter circuit, signals output from three Hall sensors H1 to H3, a power source voltage Vcc, and a ground voltage GND to the stator coils and the Hall sensor assemblies of the drive motors 101 and 102 through the cable from the motor drive circuit installed outside.

Accordingly, the cable may be introduced into the lower portion through the central through-hole 25 provided at the center of the upper plate 21 and the hollow cylindrical part 11 of the actuator housing 10, and then connected to the PCB 50 through a through-hole formed at the bottom of the actuator housing 10.

The plurality of pinion gears 81*a* to 81*d* are respectively arranged on the other side of the bottom surface 10*f* of the actuator housing 10, that is, on the same circumference around the sun gear 70, at intervals, in an eccentric state, except for one side where the motor drive mechanism 100 is arranged.

In the present invention, the plurality of pinion gears 81*a* to 81*d* may be arranged to be eccentric, and a degree of freedom of design may be increased by positioning the motor drive mechanism 100 eccentrically on one side.

In addition, in the present disclosure, the plurality of pinion gears 81*a* to 81*d* constituting the motor drive mechanism 100 and the reduction gear unit may be arranged on the same plane inside the cylindrical actuator housing 10, thereby realizing a slim structure, as a whole, of the swivel actuator 200.

The plurality of pinion gears 81*a* to 81*d* are rotatably installed on a plurality of support shafts 82*a* to 82*d* arranged on the other side of the bottom surface 10*f* of the actuator housing 10 at intervals on the same circumference with respect to the sun gear 70.

The bottom ends of the plurality of support shafts 82*a* to 82*d* are respectively fixed to a plurality of protrusions 13*a* to 13*d* protruding from the bottom surface 10*f* of the actuator housing 10.

Accordingly, the plurality of pinion gears 81*a* to 81*d* are gear-coupled to the spur gear 72 formed on an upper portion of the sun gear 70, to rotate, so that the pinion gears 81*a* to 81*d* are engaged with the ring gear 24 of the rotary table 20 to transfer the rotational power and perform a secondary reduction, thereby rotating the rotary table 20 at a low speed.

Hereinafter, an operation of the hollow swivel actuator 200 according to the present invention will be described with reference to FIGS. 1 to 8F.

First, in the hollow swivel actuator 200 according to the present invention, when the motor drive mechanism 100 installed on one side of the bottom surface 10*f* of the actuator housing 10 is operated, the BLDC-shaped first and second drive motors 101 and 102 are driven to generate a rotational output from the worm gear 35 arranged at the center of the rotary shaft 34.

The worm gear 35 rotates and drives the worm wheel 71 of the sun gear 70 rotatably supported on the outer circumference of the hollow cylindrical part 11, thereby performing a primary reduction.

When the sun gear 70 rotates, the spur gear 72 integrally formed and rotated with the worm wheel 71 on the upper portion of the sun gear is gear-coupled to the plurality of pinion gears 81*a* to 81*d* which are arranged at intervals on the same circumference and rotated with respect to the sun gear 70 so as to rotate while transmitting the reduced rotational power to the plurality of pinion gears 81*a* to 81*d*. In this case, since the spur gear 72 has a large diameter and the pinion gears 81*a* to 81*d* each have a small diameter, the speed is increased instead of the reduction.

The plurality of pinion gears 81*a* to 81*d*, which are rotated, are gear-coupled to the ring gear 24 of the rotary table 20 integrally formed inside the side surface portion to transmit the reduced rotational power to the ring gear 24, thereby performing a secondary reduction.

As a result, the center portion of the rotary table 20 is rotatably supported by the table support bearing 62 on the outer circumference of the hollow cylindrical part 11, so that the rotary table 20 may be rotated at a low speed by a stable high torque output as a large torque conversion is performed by the torque conversion according to the two-step reduction.

In general, a reduction ratio of a reducer is calculated as (the number of driven gear teeth/the number of driving pinion gear teeth), and in the case of multi-stage gear coupling, a total reduction ratio is calculated as the product of each reduction ratio.

In this case, in the present invention, when a first reduction ratio R1 between the worm gear 35 of the first and second drive motors 101 and 102 and the worm wheel 71 of the sun gear 70 is set to 168:1, and the incremental speed between the spur gear 72 of the sun gear 70 and the pinion gears 81*a* to 81*d* and a second reduction ratio R2 between the plurality of pinion gears 81*a* to 81*d* and the ring gear 24 are combined and set to 1.4:1, the total reduction ratio may be obtained as 235:1.

In this case, when the gear ratio (reduction ratio) between the gears may be set to be smaller toward the output (i.e., R1>R2), and even if a large torque conversion is performed at the final end, a stable high torque output may be obtained.

For example, when the first and second drive motors 101 and 102 are rotated at 470 rpm, the swivel actuator 200 of the present invention is reduced to 235:1 when the total reduction ratio is 235:1 by the two-stage reduction, and the rotary table 20 is reduced to a low speed of 2 rpm and the rotation torque is increased 235 times, resulting in a large torque increase.

When the swivel actuator 200 of the present invention is applied to a car seat in a vehicle, it is possible to rotate the car seat by a desired angle when conducting a meeting or the like inside the vehicle to conduct the meeting while the occupant faces each other.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the invention without departing off the spirit of the present disclosure.

INDUSTRIAL APPLICABILITY

The swivel actuator according to the present invention may be applied for rotating a passive object such as a car seat installed on a rotary table so as to rotate left and right together with the rotary table.

What is claimed is:

1. A motor drive mechanism for a hollow swivel actuator, the motor drive mechanism comprising:

a rotary shaft in which a worm gear, in which a rotational output of a motor is generated, is integrally formed at a central portion thereof, and first and second drive motors formed at both ends of the rotary shaft, respectively, wherein the first and second drive motors comprise:

first and second motor housings for accommodating both ends of the rotary shaft, respectively;

first and second rotors having magnets attached to outer circumferential portions of both end portions of the rotary shaft, respectively;

first and second stators arranged on outer sides of the first and second rotors with air gaps and configured to generate rotating magnetic fields to rotate the rotary shaft of the first and second rotors, respectively; and first and second set screws which are screw-coupled to both ends of the first and second motor housings, respectively, and enable the front ends to press and support the ends of the rotary shaft to suppress the flow of the rotary shaft.

2. The motor drive mechanism of claim 1, further comprising first and second bearings installed inside the first and second motor housings, respectively, to rotatably support the rotary shaft.

3. The motor drive mechanism of claim 1, wherein the first and second motor housings are assembled such that both ends thereof partially overlap the first and second concave grooves formed in a circular wall of an actuator housing, and the first and second set screws are manipulated using a driver from the outside.

4. The motor drive mechanism of claim 1, wherein each of the first and second motor housings comprises:

first and second motor housing bodies forming inner spaces in which the first and second rotors and the first and second stators are accommodated, respectively; and first and second motor housing covers coupled to entrances of the first and second motor housing bodies, respectively.

5. The motor drive mechanism of claim 1, wherein the first and second motor housings further comprise first and second brackets protruding from the inside and the outside, respectively, and used to fix the first and second motor housings to an actuator housing.

6. The motor drive mechanism of claim 5, wherein
the first brackets protruding from the outer sides of the first and second motor housings are fixed to overlap third and fourth concave grooves formed in a circular wall of the actuator housing, respectively, and
the second brackets protruding from the inner sides of the first and second motor housings are respectively fixed to first and second protruding fixing parts protruding from the bottom surface of the actuator housing.

7. The motor drive mechanism of claim 1, further comprising first and second through-holes in which the first and second motor housings are assembled such that bottom surfaces of the first and second motor housings are flush with a rear surface of an actuator housing when the first and second motor housings are assembled to a bottom surface of the actuator housing.

8. The motor drive mechanism of claim 1, wherein the rotary shaft is divided into three or two central portions where the first and second rotors and the worm gear are formed, and coupled using a D-cut structure.

9. The motor drive mechanism of claim 1, wherein each of the first and second stators comprises:
a stator core having a plurality of teeth each having a "T" shape and a back yoke interconnected with the plurality of teeth to form a magnetic circuit;
a bobbin integrally formed to surround an outer circumferential surface on which a coil of each of the plurality of teeth is wound; and
a coil wound around the outer circumferential surfaces of the bobbins, wherein
the plurality of teeth and the back yoke have an asymmetric structure.

10. A hollow swivel actuator comprising:
an actuator housing having a hollow cylindrical part protruding upward at a center thereof;
a motor drive mechanism arranged on one side of the bottom surface of the actuator housing, having first and second drive motors formed at both ends of a common rotary shaft, respectively, and having a worm gear integrally formed at the center of the rotary shaft to generate rotational outputs of the first and second drive motors;
a sun gear rotatably supported on an outer circumference of the hollow cylindrical part, having a worm wheel, which is gear-coupled to the worm gear at a lower side thereof so as to perform a primary reduction, and having a spur gear formed on an upper side thereof so as to transmit a rotational output of the worm wheel;
a plurality of pinion gears each arranged on the other side of the bottom surface of the actuator housing at intervals on the same circumference around the sun gear and gear-coupled to the spur gear of the sun gear and rotating; and
a rotary table in which a central portion thereof is rotatably supported on an outer circumference of the hollow cylindrical part, and the plurality of pinion gears are gear-coupled to a ring gear integrally formed inside a side portion to perform a secondary reduction.

11. The hollow swivel actuator of claim 10, further comprising:
a first bearing arranged between the bottom end of the hollow cylindrical part and the sun gear to rotatably support the sun gear;
a second bearing rotatably supporting the rotary table on an outer circumference of a top end of the hollow cylindrical part; and
a bearing support press-coupled to the outer circumference of the hollow cylindrical part and arranged between the first bearing and the second bearing.

12. The hollow swivel actuator of claim 11, wherein
the first bearing includes a needle roller bearing, and
the second bearing includes a ball bearing.

13. The hollow swivel actuator of claim 10, wherein the first and second drive motors and the plurality of pinion gears of the motor drive mechanism are arranged on the same plane on the bottom surface of the actuator housing.

14. The hollow swivel actuator of claim 10, further comprising
a motor drive circuit mounted on a printed circuit board (PCB) installed inside the actuator housing to apply motor drive signals to the first and second drive motors according to manipulation of a car seat control button of a user, wherein
the rotary table is used for rotation driving of a car seat.

* * * * *